Patented July 9, 1946

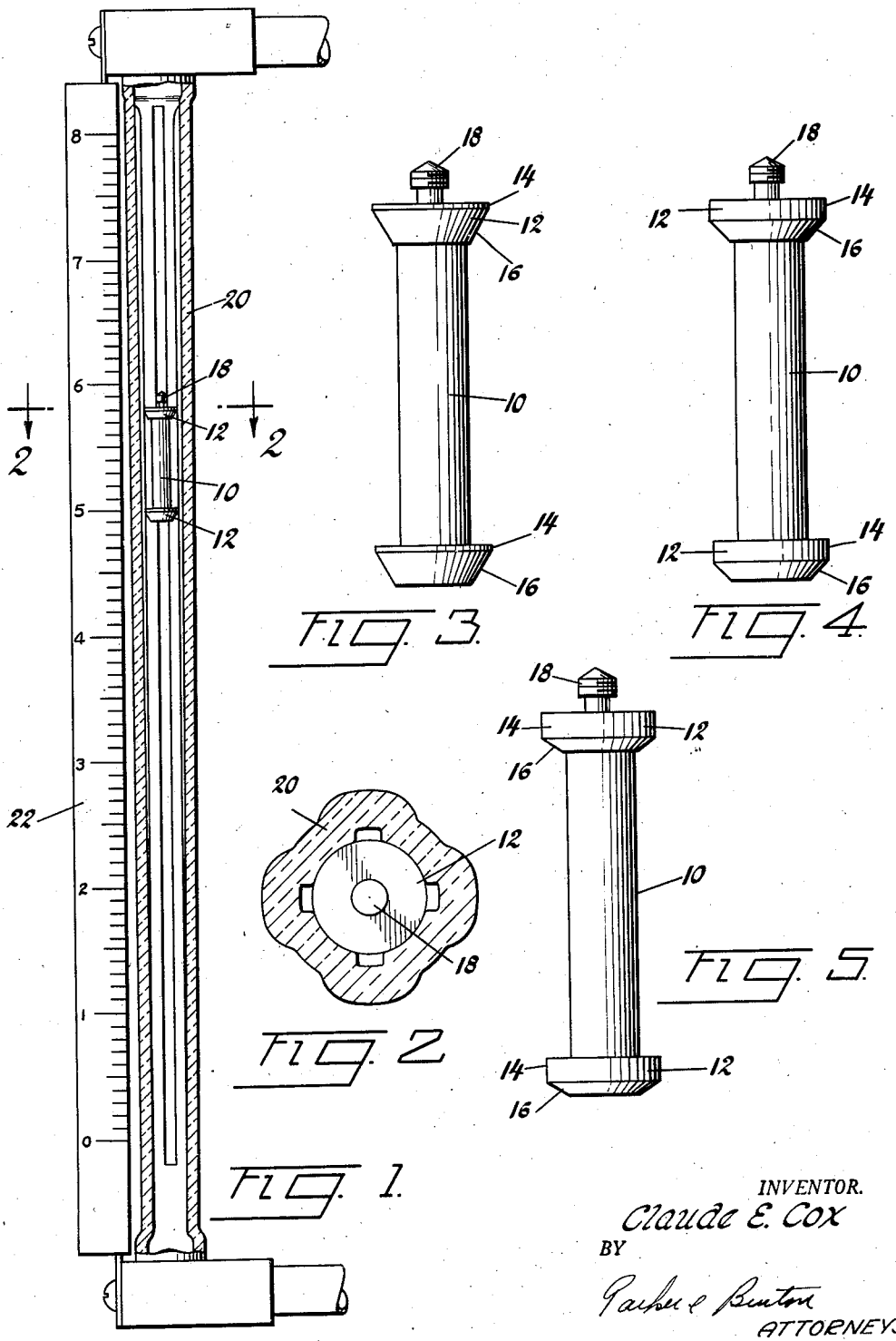

2,403,849

UNITED STATES PATENT OFFICE 2,403,849

FLOWMETER METERING HEAD

Claude E. Cox, Detroit, Mich.

Application October 29, 1943, Serial No. 508,194

3 Claims. (Cl. 73—209)

This invention relates to an improved metering head or metering float for a flow meter.

In a flow meter of the character disclosed in my co-pending applications No. 427,759, filed January 22, 1942, Patent 2,384,800, granted September 18, 1945 and No. 502,168, filed September 13, 1943, Patent 2,389,957, granted November 27, 1945, I described an upright internally tapered transparent tube within which was mounted a metering head adapted to be lifted by liquid flowed upwardly through the tube to measure the liquid flow. In the earlier filed application this metering head was shown as comprising a body having at its lower end a radially projecting annular flange provided with an arcuate peripheral surface and as having at its upper end an apertured disk flange provided with a circumferential indicating line adapted to be read against the lines of a calibration scale disposed along the length of the tube.

These flow meters are designed for very accurate measurement of flow and as shown in application No. 502,168, filed September 13, 1943, a battery of communicating tubes may be arranged in series where measurement of relatively large flow is to be made. The interior surface in the tube or bore is formed with great accuracy but minute and even microscopic variations from absolute accuracy will produce variations in reading. One method employed to adapt a specific metering head to a specific tube was to vary the weight of the head to make it rise or fall under a given flow. Such correction, however, was not always sufficient to adapt the metering head to the tube in such a manner as to insure the desired response under maximum and minimum flow and also to insure the desired overlap in a series of communicating tubes.

It has been found that if a metering head is constructed as herein set forth that it is possible to readily adapt the metering head to any specific tube to obtain this desired result.

The object, therefore, is to provide an improved metering head so shaped as to be particularly adapted for use in flow meter tubes.

Another object is to provide an improved metering head so shaped as to expose a surface to the flow of liquid through the tube which surface may be readily altered to adapt the head to occupy a determined position within the tube under a determined flow of fluid through the tube and over such surface.

Another object is to provide an improved metering head so shaped as to expose one or more surfaces to the flow of liquid through the tube, which surfaces may be varied to vary the position of the head within the tube under a predetermined liquid flow through the tube.

Other objects, advantages and meritorious features of my improved metering head will more fully appear from the following specification, appended claims and accompanying drawing wherein:

Figure 1 is a side elevation partly broken away of a flow metering tube showing my improved metering head in position therein.

Figure 2 is a cross sectional view through the metering tube taken on the line 2—2.

Figures 3, 4 and 5 are side elevations of a metering head exhibiting my invention.

The metering head is illustrated as having a spool-like configuration. It has a cylindrical axial stem portion 10 provided with radially projecting annular flanges 12 at opposite ends. The two flanges are similar in shape. Each flange has a peripheral cylindrical face 14 adjacent to its upper surface and a peripheral frusto-conical face 16 adjacent to its lower surface. An axial stud 18 projects from the upper surface of the head and is adapted to be engaged by a withdrawal device for withdrawal of the metering head from a tube within which the head is mounted.

The cylindrical peripheral face 14 might be termed the viscosity-responsive factor and the frusto-conical face 16 might be termed the turbulence-determining factor. In other words, varying the width of the cylindrical face will vary the sum total of the friction produced by the flow of liquid over such face. Increase in the width of such cylindrical face will increase the friction of liquid flowing thereover and reduction in width of such cylindrical face will reduce such resistance. Variation in the angle of the frusto-conical face will vary the turbulence resulting in the liquid as it flows over such frusto-conical face. Such turbulence may be increased or decreased by varying such angle.

It is possible, therefore, to adapt such a metering head to a flow meter tube notwithstanding variations in the interior surface of the tube which will affect the flow of liquid through the tube. A metering head having this particular arrangement of peripheral faces is, therefore, peculiarly fitted for use in flow metering tubes and is readily adapted thereto. The two radial flanges which terminate in the cylindrical faces 14 are preferably spaced apart axially a distance equal to or greater than a diameter which prevents wobbling of the float within the tube and resulting inaccuracy of measurements.

Through employing two similarly shaped flanges, one at each end of the stem, the flow effect resulting from variations from absolute accuracy in the interior surface of the tube along its length, may be averaged out.

This metering head is adapted to be mounted within a flow meter tube 20 of the character illustrated and as described in my above mentioned co-pending applications for patent. A scale 22 is shown as disposed along side of the tube. Such tube is interiorly tapered and is provided with lands extending parallel to the axis of its bore. These lands constitute radially spaced linear segments of a cylinder. These lands guide the rise and fall of the metering head within the tube and maintain it on an axial path of movement. The position of the head along the length of the bore is determined by the flow of liquid through the bore.

In Figures 3, 4 and 5 I have shown flow metering heads embodying my invention wherein the peripheral faces of the annular end flanges in the several figures have been shaped or formed to vary the response of the head to a given flow of a given liquid through the tube. In Figure 3 peripheral cylindrical faces 14 are of reduced width as compared with the peripheral cylindrical faces 14 of Figure 4 and such faces in Figure 4 are of reduced width as compared with the corresponding faces of Figure 5. The friction offered by such faces to the flow of a liquid of given viscosity thereover would therefore increase as the width increases. The cylindrical faces 14 of Figure 3 would therefore permit a maximum flow of liquid of a given viscosity at a determined position within the tube as compared with the cylindrical faces of the structures shown in Figures 4 and 5. Put in another way, the structure of Figure 3 under a given rate of flow of a given liquid would stand at a lower level within the tube than the structures of Figures 4 and 5.

It will be noted that the frusto-conical faces 16 of the structure of Figure 3 depart further from the horizontal than the frusto-conical faces of the structures of Figures 4 and 5 and would tend to produce less turbulence in a given flow of a given liquid through the tube thereover. It will be apparent that the frusto-conical face 16 might approach the horizontal to the point where the turbulence would be increased and that its variation must be carried out keeping in mind the result desired to be accomplished.

What I claim is:

1. A fluid flow meter metering head comprising an axial stem having similar radially projecting annular flanges of equal diameter at opposite ends adapted to form with the continuously tapered wall of a flow meter tube fluid passages varying in area throughout the length of the tube, said flanges being spaced apart axially on the stem a distance greater than a diameter, the periphery of each flange being defined adjacent to its top surface by a cylindrical peripheral face and being defined adjacent to its bottom surface by a peripheral frusto-conical face extending from the bottom surface upwardly and outwardly to the peripheral face, said cylindrical peripheral faces adapted to form slidable contact with lands spaced apart circumferentially within the tube and extending parallel to the axis of the tube.

2. In combination with a flow meter tube having a continuously tapered inner wall provided with circumferentially spaced lands extending parallel to the axis of the tube, a metering head comprising an axial portion provided with axially spaced equal diameter annular portions each having a periphery defined by a cylindrical peripheral face and a peripheral frusto-conical face, each cylindrical peripheral face having slidable contact with said lands and forming with the tapered inner wall of the tube a fluid passage varying in area throughout the length of said wall.

3. In combination with a flow meter tube having a continuously tapered inner wall defining a fluid passage bore, said tube provided interiorly with circumferentially spaced apart guides extending parallel to the axis of the bore, a metering head having an axial portion provided with equal diameter axially spaced apart annular flanges each having a periphery defined by a cylindrical peripheral face and a peripheral frusto-conical face, said cylindrical peripheral faces forming slidable contact with said guides and defining with the tapered inner wall of the bore a flow passageway about the head which passageway varies in area throughout the length of said bore.

CLAUDE E. COX.